United States Patent
King

(10) Patent No.: US 10,392,191 B1
(45) Date of Patent: Aug. 27, 2019

(54) RAPID RELEASE MECHANISM FOR A CURVED BELT CONVEYOR AND A METHOD OF USING THE RAPID RELEASE MECHANISM THEREOF

(71) Applicant: Kairos Conveyor Sdn. Bhd., Kluang (MY)

(72) Inventor: Stephen Charles King, Kluang (MY)

(*) Notice: Subject to any disclaimer, the term of this patent is extended or adjusted under 35 U.S.C. 154(b) by 0 days.

(21) Appl. No.: 16/188,963

(22) Filed: Nov. 13, 2018

(30) Foreign Application Priority Data

Jun. 12, 2018 (MY) .......................... PI 2018702305

(51) Int. Cl.
  *B65G 15/02* (2006.01)
  *B65G 21/16* (2006.01)
  *B65G 15/64* (2006.01)

(52) U.S. Cl.
  CPC ............. *B65G 15/64* (2013.01); *B65G 15/02* (2013.01); *B65G 21/16* (2013.01); *B65G 2812/02465* (2013.01); *B65G 2812/02534* (2013.01)

(58) Field of Classification Search
  CPC ...................................................... B65G 15/02
  USPC .......................................................... 198/831
  See application file for complete search history.

(56) References Cited

U.S. PATENT DOCUMENTS

| | | | | |
|---|---|---|---|---|
| 4,227,610 A | * | 10/1980 | Gerdes ................... | B65G 15/02 198/831 |
| 5,839,570 A | * | 11/1998 | Vertogen ................ | B65G 15/02 198/831 |
| 7,232,030 B2 | | 6/2007 | Duncan et al. | |
| 7,249,673 B2 | * | 7/2007 | Axmann ................ | B65G 15/02 198/831 |
| 8,167,121 B2 | * | 5/2012 | Yuasa ..................... | B65G 21/22 198/831 |
| 8,186,504 B2 | | 5/2012 | Schoning et al. | |
| 9,120,628 B2 | | 9/2015 | Ventz et al. | |
| 2004/0035685 A1 | * | 2/2004 | Fujiwara ................ | B65G 15/00 198/831 |

* cited by examiner

*Primary Examiner* — James R Bidwell
(74) *Attorney, Agent, or Firm* — Perkins Coie LLP

(57) ABSTRACT

A curved belt conveyor including a frame, a first pulley and a second pulley carried by the frame, and a conveyor belt positioned around the first pulley and the second pulley. The conveyor belt includes a bead fitted to an outer boundary of the conveyor belt. A plurality of pillars are coupled to the frame and positioned around the outer boundary of the conveyor belt with an unobstructed space between adjacent pairs of the plurality of pillars providing access to an interior region between upper and lower portions of the conveyor belt. A pair of opposed roller assemblies are positioned on each pillar to cooperatively engage the bead and resist inward tension from the conveyor belt. At least one of the roller assemblies of each pair of roller assemblies is pivotably coupled to its associated pillar for movement between an engaged position and a disengaged position.

19 Claims, 5 Drawing Sheets

RAPID RELEASE MECHANISM FOR A CURVED BELT CONVEYOR AND A METHOD OF USING THE RAPID RELEASE MECHANISM THEREOF

CROSS REFERENCE TO RELATED APPLICATIONS

This application claims priority to Malaysian Patent Application No. PI 2018702305, filed Jun. 12, 2018, the entirety of which is incorporated herein by reference.

TECHNICAL FIELD

The present technology relates to a curved belt conveyor, and more particularly a rapid release mechanism within a curved belt conveyor.

BACKGROUND

A curved belt conveyor is a conveying system designed to transport materials along a curved conveyor belt in a continuous operation. Curved conveying systems have been in the commercial market for many years and are integral to distribution conveyor systems such as airport baggage handling, freight handling, and parcel handling.

U.S. Pat. No. 8,186,504 B2 disclosed a curved belt conveyor wherein a conveyor belt assembly has a one-piece frame comprising a first holder, a second holder, a third holder, and a fourth holder. A roller coupled to each respective holder engages the conveyor belt, wherein each roller rotates on its own axis relative to its respective position. There is a distance between the first and second rollers to guide a conveyor belt therebetween.

U.S. Pat. No. 9,120,628 B2 disclosed a curved belt conveyor having a plurality of rollers to guide an application element. The plurality of rollers are arranged on a retaining element connected to a side wall. Each retaining element has at least one roller holder holding a roller, wherein the roller holder is pivoted such that the roller contacts the application element. There are two fastening joints wherein the roller holder moves from a first fastening joint to a second fastening joint to disengage the roller from the application element.

U.S. Pat. No. 7,232,030 B2 disclosed a conveyor belt with a spring-loaded bolt activated by a lever to connect an L-shaped upper bracket holding a first roller to an L-shaped lower bracket holding a second roller. The lever uses the force stored by the spring-loaded bolt to move the L-shaped upper bracket upwards and backwards. When both L-shaped brackets are connected, both of the first and second rollers engage the conveyor belt.

There are some drawbacks and limitations on the conveyors described in the prior art as the conveyors require significant time and dismantling for effective maintenance work to be done. Therefore, there is a need to provide an apparatus that could overcome the aforementioned shortcomings and allow simple and more expedient maintenance work.

SUMMARY

It is an objective of the present technology to provide a rapid release mechanism for a curved belt conveyor to conduct maintenance work with reduced dismantling of the curved belt conveyor.

It is also an objective of the present technology to provide the rapid release mechanism for the curved belt conveyor to reduce downtime operations.

It is another objective of the present technology to provide lateral access to the outer radius of the curved belt conveyor for maintenance work.

It is also another objective of the present technology to provide a structural pillar for the rapid release mechanism, which can be easily installed or dismantled from the curved belt conveyor.

It is yet another objective of the present technology to provide a bearing holder for the rapid release mechanism, which can be easily installed or dismantled from the structural pillar.

The present technology relates to rapid release mechanisms for curved belt conveyors, comprising: a frame; a drive pulley connected to the frame; a tail pulley connected to the frame; a conveyor belt revolved around the drive pulley and the tail pulley; a molded material fitted to the outer boundary of the conveyor belt; a plurality of bearings to guide the molded material; the frame does not have side walls; a plurality of closed-ended C-shaped structural pillars connected to the frame; a ring plate connected to the closed ended C-shaped structural pillars; and a plurality of bearing holders; wherein each bearing holder holds one bearing; a pair of latches on each bearing holder to engage said bearing holder to the closed-ended C-shaped structural pillar; and at least one pair of bearing holders coupled to each closed-ended C-shaped structural pillar.

The present technology also relates to a method of using a rapid release mechanism for a curved belt conveyor, comprising: disengaging at least one bearing holder coupled to each closed-ended C-shaped structural pillar with a latch from said bearing holder; and pivoting the bearing holder until a bearing on said bearing holder no longer contacts a molded material fitted to a conveyor belt.

The present technology also relates to another method of using the rapid release mechanism for the curved belt conveyor, comprising: removing at least one closed-ended C-shaped structural pillar connected to a frame and a ring plate; replacing a bearing holder engaged to said closed-ended C-shaped structural pillar; replacing the closed-ended C-shaped structural pillar; and reconnecting the closed-ended C-shaped structural pillar to the frame and the ring plate.

The following description describes the disclosed technology in detail with reference to non-limiting embodiments.

BRIEF DESCRIPTION OF THE DRAWINGS

The drawings are included to provide a further understanding of the present technology. The drawings illustrate embodiments of the technology and together with the description explain the principles of the embodiments of the technology.

Figure 1:
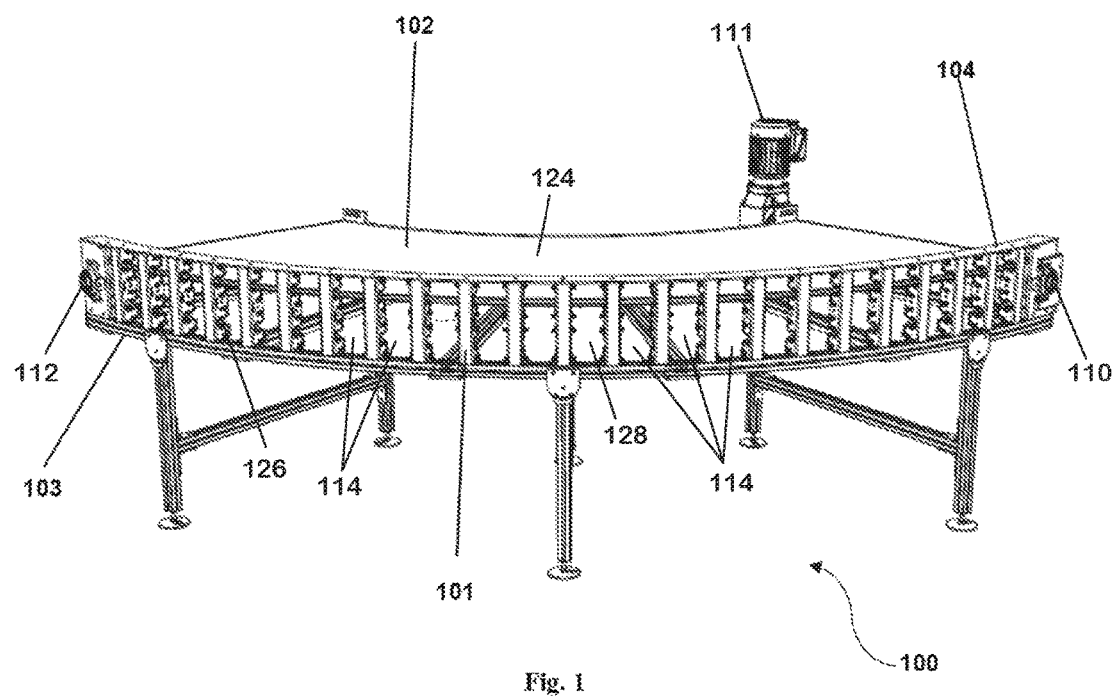
FIG. 1 depicts a curved belt conveyor according to a representative embodiment.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives of the technology falling within the scope of this disclosure.

DETAILED DESCRIPTION

Various examples of the mechanisms, systems, and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below to avoid unnecessarily obscuring the relevant description.

The following description of the present technology is now described with reference to FIG. 1 to FIG. 5.

The present technology relates to a rapid release mechanism for a curved belt conveyor (100), comprising: a frame (103); a drive pulley connected to the frame (103); a tail pulley connected to the frame (103); a conveyor belt (102) revolved around the drive pulley and the tail pulley; a molded material fitted to the outer boundary of the conveyor belt (102); a plurality of bearings (106) to guide the molded material; the frame (103) does not have side walls; a plurality of closed-ended C-shaped structural pillars (101) connected to the frame (103); a ring plate (104) connected to the closed-ended C-shaped structural pillars (101); and a plurality of bearing holders (109); wherein each bearing holder (109) holds one bearing (106); at least one latch (105) on each bearing holder (109) to engage said bearing holder (109) to the closed-ended C-shaped structural pillar (101); and at least one pair of bearing holders (109) coupled to each closed-ended C-shaped structural pillar (101).

In an embodiment of the curved belt conveyor (100), the molded material is a PU bead sewn to the conveyor belt (102).

In an embodiment of the curved belt conveyor (100), each bearing holder (109) has a groove on two sides of said bearing holder (109).

In an embodiment of the curved belt conveyor (100), the front side of the bearing holder (109) has a larger dimension than the closed-ended C-shaped structural pillar (101) for seating the bearing holder (109) against the edge of each side of the closed-ended C-shaped structural pillar (101).

In an embodiment of the curved belt conveyor (100), a fastener (108) can fasten the bearing holder (109) to the closed-ended C-shaped structural pillar (101) at the groove of the bearing holder (109).

In a further embodiment of the curved belt conveyor (100), the fastener (108) can be a pin.

In an embodiment of the curved belt conveyor (100), the latch (105) can comprise a flexible limb.

In a further embodiment of the curved belt conveyor (100), the latch (105) can comprise a lever, a clamp, a latch, and a ridge.

In an embodiment of the curved belt conveyor (100), two pairs of bearing holders (109) are coupled to one closed-ended C-shaped structural pillar (101).

In an embodiment of the curved belt conveyor (100), the closed-ended C-shaped structural pillar (101) has an aperture (115) to receive the latch (105) of the bearing holder (109).

In another embodiment of the curved belt conveyor (100), the closed-ended C-shaped structural pillars (101) can have male connectors, wherein the corresponding bearing holder (109) can have corresponding female receptors.

In an embodiment of the curved belt conveyor (100), each closed-ended C-shaped structural pillar (101) has a recess between each pair of bearing holders (109) to allow the conveyor belt (102) and the molded material to move between the closed-ended C-shaped structural pillar (101).

In an embodiment of the curved belt conveyor (100), the closed-ended C-shaped structural pillar (101) has a pair of hooks for each bearing holder (109) coupled to said closed-ended C-shaped structural pillar (101).

In an embodiment of the curved belt conveyor (100), each bearing holder (109) has a pair of engagement joints or pins (107) to engage the pair of hooks from the closed-ended C-shaped structural pillar (101).

In an embodiment of the curved belt conveyor (100), said engagement joints or pins (107) can be a circular extension or pin at one end of the bearing holder (109) to engage the pair of hooks of the closed-ended C-shaped structural pillar (101).

In an embodiment of the curved belt conveyor (100), the side of the bearing holder (109) has a gap corresponding to the shape of the hook of the closed-ended C-shaped structural pillar (101) to further engage the pair of hooks.

In an embodiment of the curved belt conveyor (100), the ring plate (104) dictates the arrangement of each corresponding closed-ended C-shaped structural pillar (101) connected to the frame (103).

In an embodiment of the curved belt conveyor, there is a recess between each corresponding closed-ended C-shaped structural pillar (101) connected to the frame (103).

The present technology also relates to a method of using a rapid release mechanism for a curved belt conveyor (100), comprising: disengaging at least one bearing holder (109) coupled to each closed-ended C-shaped structural pillar (101) with a latch (105) from the bearing holder (109); and pivoting the bearing holder (109) until a bearing (106) on said bearing holder (109) no longer contacts a molded material fitted to a conveyor belt (102).

In an embodiment of the method of using the rapid release mechanism, a further step comprises: replacing the conveyor belt (102); and renewing the conveyor belt (102).

In another embodiment of the method of using the rapid release mechanism, further steps may comprise: removing a fastener (108) from a corresponding bearing holder (109); pivoting said bearing holder (109) until the bearing holder (109) no longer engages a pair of hooks on the corresponding closed-ended C-shaped structural pillar (101); replacing the bearing (106); reengaging said bearing holder (109) to the pair of hooks on the closed-ended C-shaped structural pillar (101); pivoting the bearing holder (109) until the bearing (106) on said bearing holder (109) contacts the molded material; engaging the bearing holder (109) to the corresponding closed-ended C-shaped structural pillar (101) with the latch (105) of said bearing holder (109); and placing the fastener (108) into said bearing holder (109).

In another embodiment of the method of using the rapid release mechanism, further steps may comprise: pivoting the bearing holder (109) until the bearing (106) on said bearing holder (109) contacts the molded material fitted to the conveyor belt (102); and engaging the bearing holder (109) with the latch (105) to the closed-ended C-shaped structural pillar (101).

The disclosed technology also relates to another method of using a rapid release mechanism for a curved belt conveyor (100), comprising: removing a closed-ended C-shaped structural pillar (101) connected to a frame (103) and a ring plate (104); conducting maintenance work on the removed closed-ended C-shaped structural pillar (101); and connecting said closed-ended C-shaped structural pillar (101) to the frame (103) and the ring plate (104).

In another embodiment of the method the maintenance work comprises: replacing a bearing holder (109) engaged to said closed-ended C-shaped structural pillar (101); and replacing the closed-ended C-shaped structural pillar (101).

FIG. 1 illustrates a curved belt conveyor (100) with a rapid release mechanism. A conveyor belt (102) revolves around a first pully, such as drive pulley (110), and a second pulley, such as tail pulley (112), wherein a frame (103) is located on both sides of the conveyor belt (102). The drive pulley (110) and the tail pulley (112) are each located at one end of the frame (103). The drive pulley (110) can be operatively coupled (e.g., via a gearbox) to a drive motor (111) and associated drivers and controllers, for example. A row of closed-ended C-shaped structural pillars (101) are located along the frame (103). The lower end of each closed-ended C-shaped structural pillar (101) is connected to the frame (103), wherein the upper end of said closed-ended C-shaped structural pillar (101) is connected to a ring plate (104) along an outer boundary of the conveyor belt (102). The plurality of closed-ended C-shaped structural pillars (101) connected between the frame (103) and the ring plate (104) provide structural integrity yet replaces the need for an outer profile or sidewall. Accordingly, there are a plurality of unobstructed open spaces (114) between adjacent pairs of the closed-ended C-shaped structural pillars (101) providing access to an interior region (128) between upper (124) and lower (126) portions of the conveyor belt (102). The open spaces (114) facilitate maintenance and/or repairs, thus providing advantages over prior art systems in terms of cost and downtime, for example.

The ring plate (104) has a plurality of connecting points to connect to each closed-ended C-shaped structural pillar (101), wherein each corresponding closed-ended C-shaped structural pillar (101) can be spaced out evenly. Sufficient spacing between each corresponding closed-ended C-shaped structural pillar (101) ensures lateral access to each closed-ended C-shaped structural pillar (101). Preferably, said spacing is sufficient to allow a human arm to move freely. In turn, a user can have access to each rapid release mechanism for ease of assembly, replacement of parts, and maintenance.

A molded material is fitted to the outer boundary of the conveyor belt (102), wherein the molded material can be a polymer bead (116) (FIG. 3) which can be sewn on the conveyor belt (102). In some embodiments, the bead (116) can comprise polyurethane (PU). The molded material is engaged by a plurality of bearings (106) (FIG. 2) which in turn ensures that the conveyor belt (102) moves along an intended path guided by the plurality of bearings (106). It is important that the molded material runs in an intended geometry to ensure minimum friction and abrasion throughout said conveyor belt (102) in the curved belt conveyor (100) system.

Figure 2:
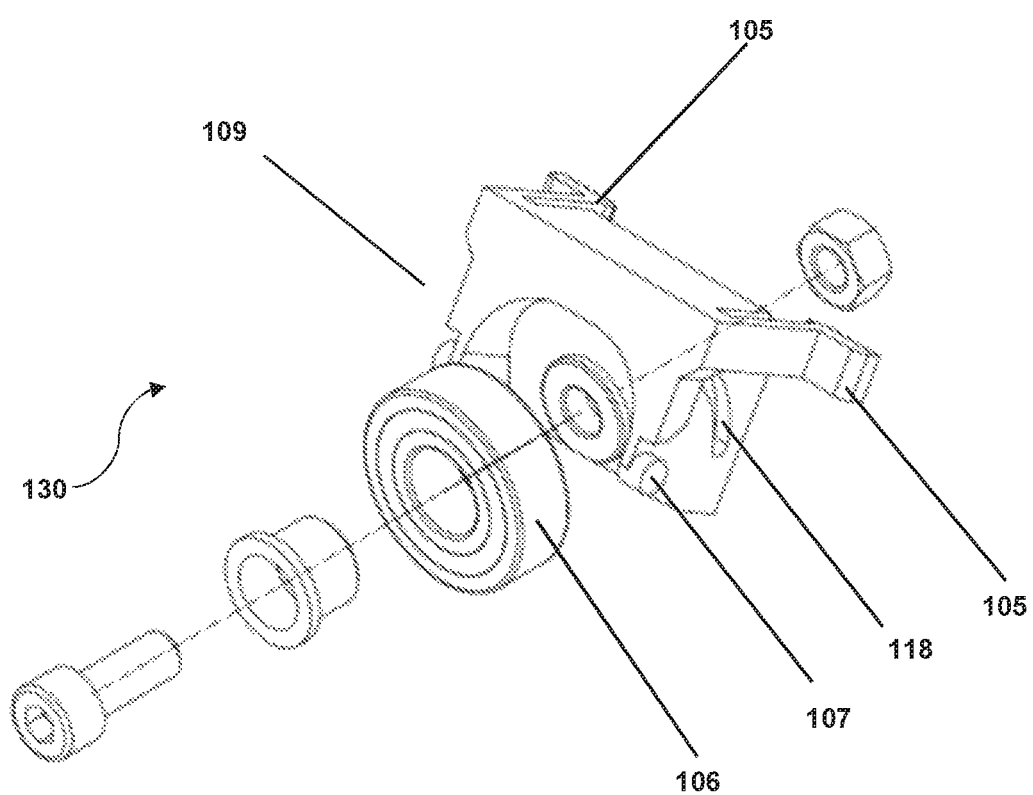
FIG. 2 depicts an exploded isometric view of the bearing holder.

FIG. 2 illustrates a roller assembly (130) configured such that opposed pairs of roller assemblies (130) can engage the bead (116) thereby providing tension to the outer boundary of the conveyor belt (102). The roller assembly (130) can include a holder (109) supporting a roller, such as bearing (106). In some embodiments, the roller can comprise a solid roller positioned on a separate bearing. The bearing (106) is held in position by a corresponding bearing holder (109). Each bearing holder (109) has a pair of latches (105), wherein the latches (105) can comprise a lever, a clamp, a ridge, a handle, an arm, and a latch. In the present technology, the latches (105) can be a flexible lever to ensure easy engagement and detachment from the closed-ended C-shaped structural pillar (101).

Figure 3:
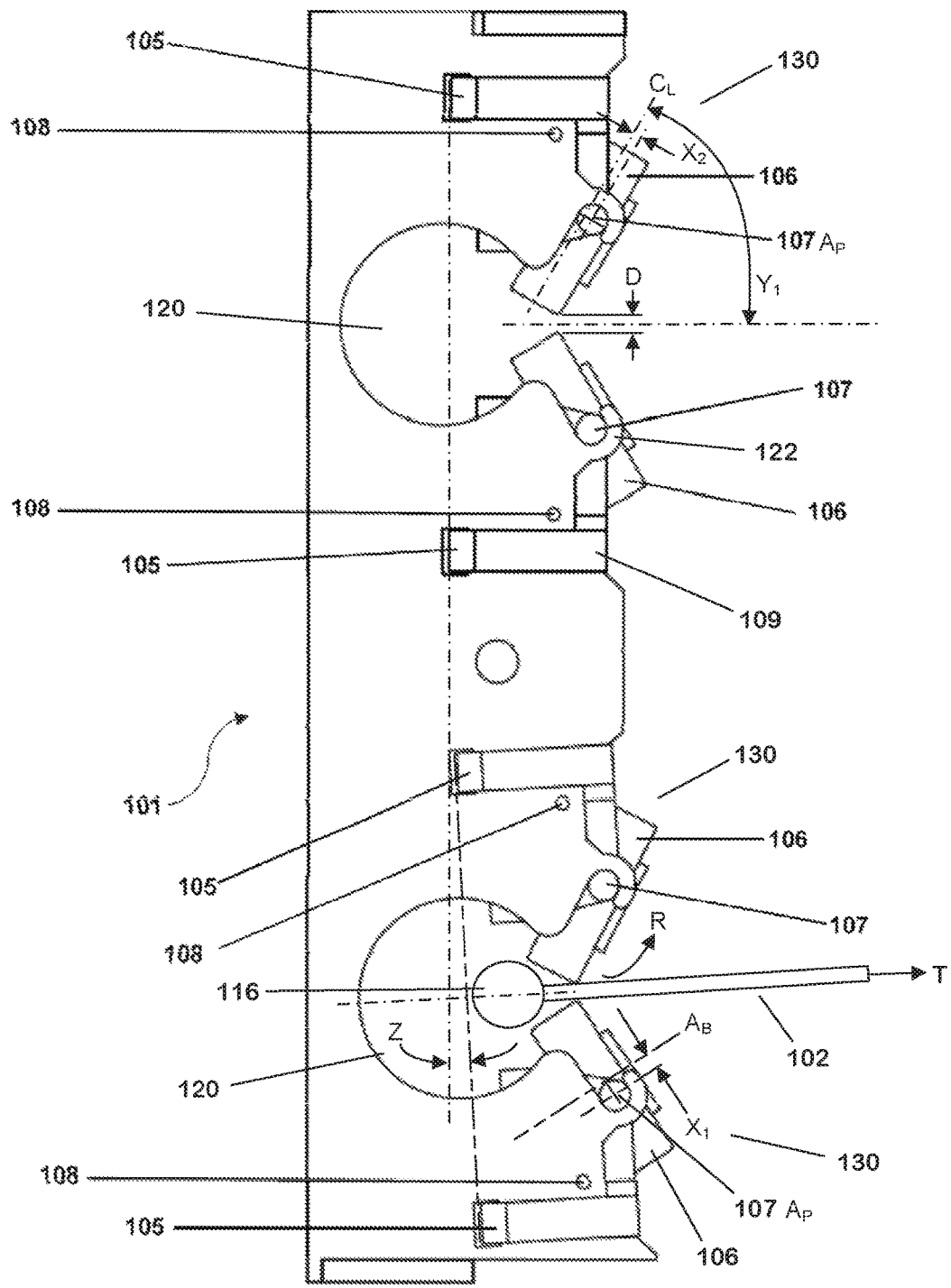
FIG. 3 depicts a side view of two pairs of bearing holders coupled to a closed-ended C-shaped structural pillar.

Each bearing holder (109) can also have a pair of opposed engagement joints or pins (107) at one end of the bearing holder (109) and a groove located at both left and right sides of the bearing holder (109). Preferably, the pair of engagement joints (107) are each circular in shape for easier engagement and pivoting when coupled to the closed-ended C-shaped structural pillar (101). The engagement joints or pins (107) define a pivot axis ($A_P$) (FIG. 3). Similarly, the groove (118) on the bearing holder (109) is curved to facilitate the engagement and rotating movement of the bearing holder (109).

In an example of the present technology, the front side of the bearing holder (109) may have a larger dimension than the closed-ended C-shaped structural pillar (101) for seating the bearing holder (109) against the edge of each side of the closed-ended C-shaped structural pillars (101). Referring to FIG. 3, two pairs of bearing holders (109) are coupled to one closed-ended C-shaped structural pillar (101). The higher positioned pair of bearing holders (109) engage the upper portion of the conveyor belt (102). The lower positioned pair of bearing holders (109) engage the lower portion of the conveyor belt (102). Each of the bearing holders (109) can be fastened to the closed-ended C-shaped structural pillar (101) with a fastener (108). The fastener (108) ensures that bearing holder (109) is retained to the closed-ended C-shaped structural pillar (101) when the bearing holder (109) is pivoted such that the bearing (106) no longer contacts the molded material. In the present technology, the fastener (108) can be a pin, screw, or other suitable fastener. The fastener (108) is placed such that the pin is located at one end of the groove (118) (FIG. 2) of the bearing holder (109). In some embodiments, the groove (118) extends arcuately and can be centered on a corresponding one of the engagement joints or pins (107). Accordingly, the arcuate groove (118) allows the bearing holder (109) to pivot, yet retains the bearing holder (109) to the closed-ended C-shaped structural pillar (101) when the latches (105) are disengaged therefrom.

Each closed-ended C-shaped structural pillar (101) can have a recess (120) between opposed pairs of bearing holders (109) to allow the conveyor belt (102) and molded material to move past said closed-ended C-shaped structural pillar (101) while the bearing (106) in each bearing holder (109) engages the molded material.

Figure 4:
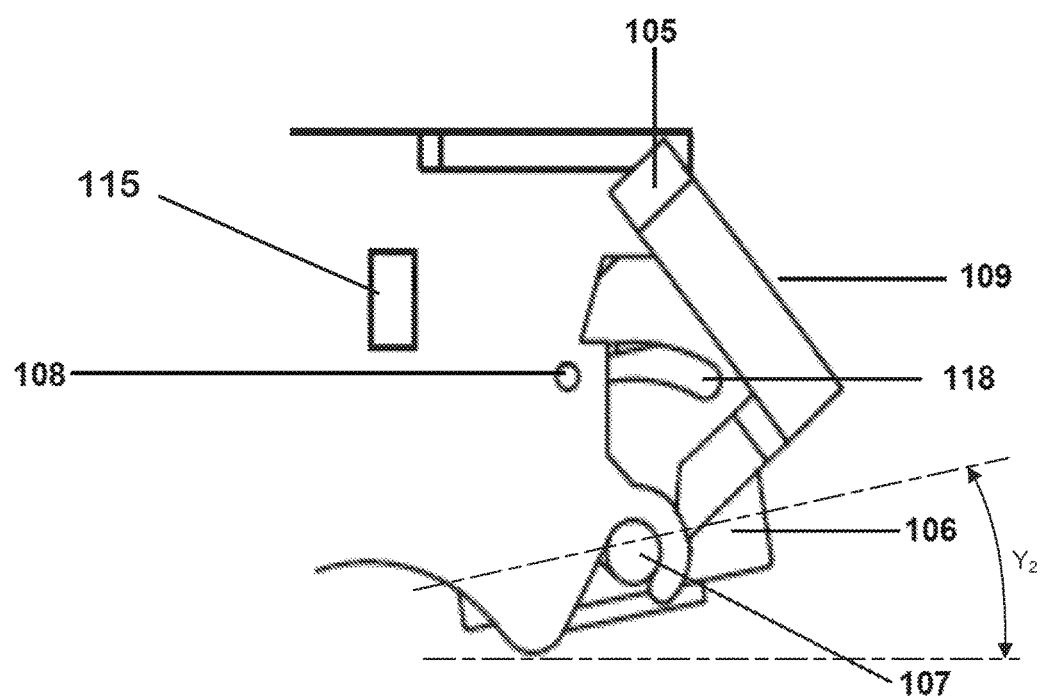
FIG. 4 depicts a perspective view of the bearing holder disengaged from the closed-ended C-shaped structural pillar.
Figure 5:
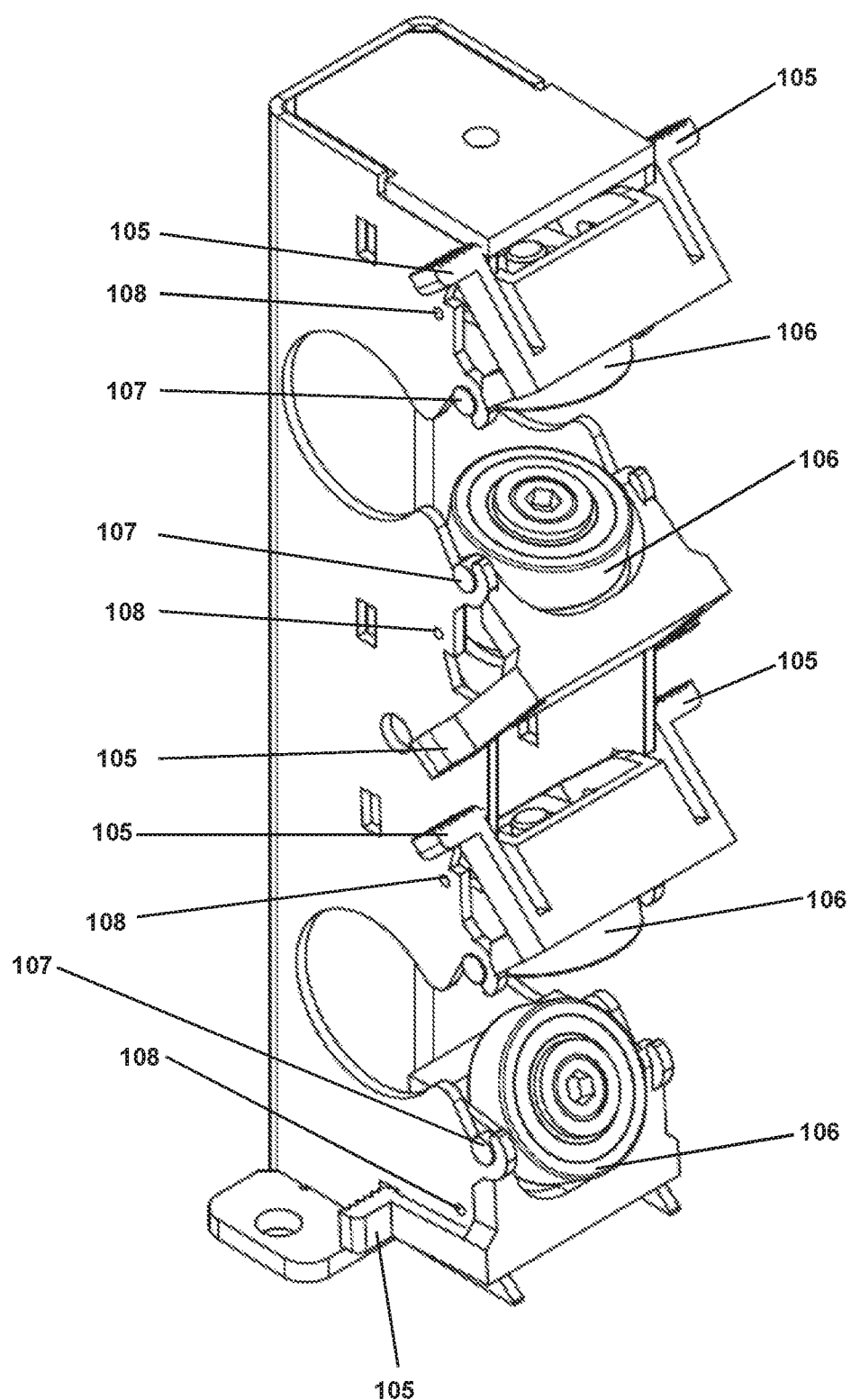
FIG. 5 depicts an isometric view of two pairs of bearing holders coupled to the closed-ended C-shaped structural pillar.

With continued reference to FIG. 3, two pairs of opposed roller assemblies (130) can be positioned on each pillar to cooperatively engage the bead (116) of the upper and lower portions of the conveyor belt (102) in order to resist inward tension (T) from the conveyor belt (102) which occurs with all curved belt conveyors when operational. This inward tension (T) is the result of the belt's tendency to slide off of the pulleys (110/112) (FIG. 1). At least one of the roller assemblies (130) of each pair of roller assemblies (130) can be pivotably coupled to its associated pillar (101) for movement between an engaged position, such as shown in FIG. 3, and a disengaged position, such as shown in FIGS. 4 and 5.

Each roller assembly (130) can include a holder (109) and a roller (106) rotatably mounted on the holder (109). The roller (106) can be mounted on the holder (109) such that the roller is oriented at a first acute angle ($Y_1$) (FIG. 3) with respect to the conveyor belt (102) when the roller assembly (130) is in the engaged position. Furthermore, the roller (106) is oriented at a second acute angle ($Y_2$) (FIG. 4), smaller than the first acute angle, with respect to the conveyor belt (102) when the roller assembly (130) is in the disengaged position.

In some embodiments, the holder (109) pivots about a pivot axis ($A_P$) offset a distance ($X_1$) from the roller's axis ($A_B$). In some embodiments, the holder (109) pivots about a pivot axis ($A_P$) offset a distance ($X_2$) from a centerline ($C_L$) of the roller. In some embodiments, the holder (109) pivots about a pivot axis ($A_P$) substantially centered on the roller (106). For example, in some embodiments, the pivot axis ($A_P$) can be within approximately ±0.25 inches of the roller's axis $A_B$ and ±0.25 inches of the center line $C_L$ of the roller.

In some embodiments, the pivot axis ($A_P$) is positioned with respect to the center of the roller such that inward tension (T) from the conveyor belt (102) urges the roller assembly (130) to rotate (indicated by arrow R) toward the engaged position. In some embodiments, the pivot axis ($A_P$) is positioned with respect to the center of the roller such that inward tension (T) from the conveyor belt (102) urges the roller assembly (130) to rotate (indicated by arrow R) toward the engaged position and such that the rollers 106 move toward the conveyor belt (102), thereby decreasing a distance (D) between opposed rollers (106). When the roller assemblies (130) are moved to the disengaged position, the distance (D) increases thereby allowing the bead (116) to be removed from between the rollers (106).

The upper pair of roller assemblies (130) can be vertically oriented as shown in FIG. 3. In some embodiments, the lower pair of roller assemblies (130) can be oriented at an angle (Z) with respect to the vertically oriented upper pair of roller assemblies (130). Angle (Z) can be adjusted based on the width of the conveyor belt (102). Angling the lower pair of roller assemblies (130) can reduce wear and stress on the conveyor belt (102) adjacent the bead (116).

The closed-ended C-shaped structural pillar (101) has an aperture (115) compatible with the latch (105) of the bearing holder (109). In a representative embodiment, the aperture (115) can include a rectangular opening on the closed-ended C-shaped structural pillar (101) to receive the flexible lever. In an alternative embodiment of the present technology, the closed-ended C-shaped structural pillar (101) may have male connector parts such as a protruding member, wherein the bearing holder (109) connects to the protruding member with a corresponding lever.

Each closed-ended C-shaped structural pillar (101) can have a pair of hooks (122) located on opposing sides for each bearing holder (109) coupled to said closed-ended C-shaped structural pillar (101). The pair of engagement joints or pins (107) of each bearing holder (109) is seated into the corresponding pair of hooks, wherein the circular design of the engagement joints (107) ensures a rotational movement within the pair of hooks when the bearing holder (109) is pushed forward or backwards. The bearing holder (109) may have a gap along the pair of engagement joints (107), wherein said gap is corresponding to the shape of the hook. Therefore, the bearing holder (109) maintains position in relation to the pair of hooks and groove when the bearing holder (109) is rotated.

The combination of engagement joints (107) with the pair of hooks (122) on the front face of the closed-ended C-shaped structural pillar (101) ensure any lateral force applied on or by the bearing holder (109) when operating the present technology is not transferred to any part of the latch (105). Instead, having said lateral force transferred to the engagement joints (107) and the front face of the closed-ended C-shaped structural pillar (101) ensures the structural integrity of the latch (105) throughout the life of the present technology. This is important as the latch (105) is usually made from flexible materials (e.g., plastic), which any increase of lateral force may eventually weaken the latch (105).

As the latch (105) on the bearing holder (109) is pulled backwards to engage onto the closed-ended C-shaped structural pillar (101), the bearing holder (109) rotates around the pair of hooks and subsequently the bearing (106) reengages the molded material. When the curved belt conveyor (100) is operational, the lateral force (T) applied from the molded material to the bearing (106) is transferred from the bearing (106) to the engagement joints (107) and the front face of the closed-ended C-shaped structural pillar (101).

In an alternate embodiment of the pair of hooks, the pair of hooks is facing upwards, thus allowing the pair of hooks to provide additional support to the engagement joints (107) of the bearing holder (109).

The technology also discloses methods of using rapid release mechanisms in a curved belt conveyor (100). The rapid release mechanism allows the user to conduct maintenance work with reduced downtime and minimal dismantling required. Examples of maintenance works may be one but not limited to replacing any parts in a curved belt conveyor (100), such as conveyor belt (102) realignment or removing any foreign objects.

One part of the rapid release mechanism is the bearing holder (109). The bearing holder (109) in this present technology can be removed independently. Furthermore, the spacing available between each closed-ended C-shaped structural pillar (101), facilitates removing and replacing any damaged bearing holders (109) resulting in reduced conveyor downtime.

FIGS. 4 and 5 display the bearing holder (109) disengaged from the closed-ended C-shaped structural pillar (101). The movement of the bearing holder (109) is limited to the length and design of the groove (118). In a representative embodiment, the groove on the bearing holder (109) is a curved groove.

In an example for replacing a conveyor belt (102) in the curved belt conveyor (100), the user may disengage a bearing holder (109) by pushing the latch (105) of said bearing holder (109) forward, wherein the forward push pivots the bearing holder (109) about axis ($A_P$) inside the pair of hooks (122) until the corresponding bearing (106) on said bearing holder (109) no longer contacts the molded material fitted to the conveyor belt (102). The movement is achieved by swiveling the engagement joints (107) of the bearing holder (109) around the pair of hooks (122) on the closed-ended C-shaped structural pillar (101), raising the bearing (106) on said bearing holder (109) backwards. The user repeats this for all bearing holders (109) and the lateral access provided by the arrangement of closed-ended C-shaped structural pillar (101) ensures that the conveyor belt (102) can be replaced without dismantling the entire curved belt conveyor (100).

Once the bearing holder (109) is no longer in contact with the conveyor belt (102), the user may remove the conveyor belt (102) for inspection. If the inspected conveyor belt (102) is damaged, the conveyor belt (102) is replaced with a new conveyor belt (102). Once the new conveyor belt (102) is in place, the user pulls each bearing holder (109) backwards until the latch (105) reengages the corresponding closed-ended C-shaped structural pillar (101). When the bearing holder (109) is pulled backwards, the corresponding bearing (106) moves forward and reengages the molded material.

In an alternate embodiment of the bearing holder (109), the groove of the bearing holder (109) may be a straight horizontal groove. When the bearing holder (109) is disengaged from the closed-ended C-shaped structural pillar (101), the bearing holder (109) may be pushed in a straight horizontal direction until the bearing holder (109) no longer engages the molded material.

In an example for replacing one bearing (106) from a bearing holder (109) in the curved belt conveyor (100), the user may remove a fastener (108) from corresponding bearing holder (109). Next, push the latches (105) forward from one end of the groove on the bearing holder (109) to the other end of the groove to pivot said bearing holder (109) until the sides of the bearing holder (109) no longer touches the sides of closed-ended C-shaped structural pillar (101). The user then removes said bearing holder (109) from the pair of hooks (122); wherein the user may inspect the bearing (106) for any problems or simply replaces the entire bearing holder (109). Once the inspection is complete, the user re-engages the engagement joints (107) of bearing holder (109) to the pair of hooks (122) of said corresponding closed-ended C-shaped structural pillar (101). The user pulls the bearing holder (109) backwards with the latches (105) of said bearing holder (109) until the latches (105) engage the closed-ended C-shaped structural pillar (101). Finally, replacing the fastener (108) into said bearing holder (109).

Another example of using the rapid release mechanism is the removal and replacement of the closed ended C-shaped structural pillar (101). The user may remove one closed-ended C-shaped structural pillar (101) connected to the frame (103) and the ring plate (104), allowing said structural pillar to be accessed. Any issues including the integrity of bearing holder (109) and bearing (106) can be accessed without dismantling the entire curved belt conveyor (100), furthermore, the curved belt conveyor (100) may still operate without said closed-ended C-shaped structural pillar (101).

Any damaged parts such as bearing (106) can be easily removed from said closed-ended C-shaped structural pillar (101). Once the repairs are made, the closed-ended C-shaped structural pillar (101) can be reassembled and reconnected to the frame (103) and the ring plate (104).

In some embodiments, a curved belt conveyor can comprise a frame, a first pulley carried by the frame, a second pulley carried by the frame, and a conveyor belt positioned around the first pulley and the second pulley, wherein the conveyor belt includes a bead fitted to an outer boundary of the conveyor belt. A plurality of pillars can be coupled to the frame and positioned around the outer boundary of the conveyor belt with an unobstructed space between adjacent pairs of the plurality of pillars to provide access to an interior region between upper and lower portions of the conveyor belt. A pair of opposed roller assemblies can be positioned on each pillar to cooperatively engage the bead and resist inward tension from the conveyor belt, wherein at least one of the roller assemblies of each pair of roller assemblies is pivotably coupled to its associated pillar for movement between an engaged position and a disengaged position.

In some embodiments, the curved belt conveyor can further comprise a ring plate coupled to each of at least some of the plurality of pillars at an end opposite the frame. In some embodiments, each roller assembly includes a holder and a roller rotatably mounted on the holder, and wherein the roller is mounted on the holder such that the roller is oriented at a first acute angle with respect to the conveyor belt when the roller assembly is in the engaged position. In some embodiments, the roller is oriented at a second acute angle, smaller than the first acute angle, with respect to the conveyor belt when the roller assembly is in the disengaged position. In some embodiments, the holder pivots about a pivot axis substantially centered on the roller. In some embodiments, the holder pivots about a pivot axis positioned with respect to a center of the roller such that inward tension from the conveyor belt urges the roller assembly toward the engaged position. In some embodiments, the curved belt conveyor can further comprise a pair of latches positioned on the holder for engagement with the pillar to retain the roller assembly in the engaged position. In some embodiments, the curved belt conveyor can further comprise a motor operatively coupled to the first pulley. In some embodiments, the plurality of pillars are each comprised of a C-shaped member.

In some embodiments, a frame pillar assembly for a curved belt conveyor can comprise a C-shaped pillar couplable to the frame of a curved conveyor and a pair of opposed roller assemblies positioned on the C-shaped pillar to cooperatively engage a conveyor belt bead and resist inward tension from the conveyor belt, wherein each roller assembly is pivotably coupled to the C-shaped pillar for movement between an engaged position and a disengaged position. In some embodiments, each roller assembly can include a holder having a pair of opposed pins defining a pivot axis and a roller rotatably mounted on the holder. The roller can be oriented at a first acute angle with respect to the conveyor belt when the roller assembly is in the engaged position and the roller can be oriented at a second acute angle, smaller than the first acute angle, with respect to the conveyor belt when the roller assembly is in the disengaged position.

In some embodiments, the pivot axis is substantially centered on the roller. In some embodiments, the pivot axis is positioned with respect to a center of the roller such that inward tension from the conveyor belt urges the roller assembly toward the engaged position. In some embodiments, the C-shaped pillar includes a pair of opposed hooks positioned to removably receive the pair of opposed pins of the holder. In some embodiments, the holder includes a pair of arcuate grooves each centered on a corresponding one of the pair of opposed pins. In some embodiments, the pair of opposed roller assemblies is a first pair of opposed roller assemblies and further comprising a second pair of opposed roller assemblies oriented at an angle with respect to the first pair. In some embodiments, the curved belt conveyor can further comprise a pair of latches positioned on the holder for engagement with the C-shaped pillar to retain the roller assembly in the engaged position. In some embodiments, the pair of latches each engage the C-shaped pillar from the outside of the C-shaped pillar. In some embodiments, the roller comprises a bearing.

In some embodiments, a roller assembly for a curved belt conveyor can comprise a holder and a roller rotatably mounted on the holder, wherein the pivot axis is substantially centered on the roller. In some embodiments, the holder can include a pair of opposed pins defining a pivot axis, a pair of latches positioned for engagement with a conveyor frame assembly, and a pair of arcuate grooves each centered on a corresponding one of the pair of opposed pins. In some embodiments, the roller comprises a bearing.

In some embodiments, a method of using a frame pillar assembly for a curved belt conveyor can comprise pivoting a roller assembly, with respect to a frame pillar, from an engaged position to a disengaged position; wherein a roller of the roller assembly is oriented at a first acute angle with respect to a conveyor belt associated with the curved belt conveyor when the roller assembly is in the engaged position and the roller is oriented at a second acute angle, smaller than the first acute angle, with respect to the conveyor belt when the roller assembly is in the disengaged position; removing the conveyor belt from the curved belt conveyor while the roller assembly is in the disengaged position; installing a second conveyor belt onto the curved belt conveyor while the roller assembly is in the disengaged position; and pivoting the roller assembly, with respect to a frame pillar, from the disengaged position to the engaged position.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A curved belt conveyor, comprising:
   a frame;
   a first pulley carried by the frame;
   a second pulley carried by the frame;
   a conveyor belt positioned around the first pulley and the second pulley, wherein the conveyor belt includes a bead fitted to an outer boundary of the conveyor belt;
   a plurality of pillars coupled to the frame and positioned around the outer boundary of the conveyor belt with an unobstructed space between adjacent pairs of the plurality of pillars to provide access to an interior region between upper and lower portions of the conveyor belt; and
   a pair of opposed roller assemblies positioned on each pillar to cooperatively engage the bead and resist inward tension from the conveyor belt, wherein at least one of the roller assemblies of each pair of roller assemblies is pivotably coupled to its associated pillar for movement between an engaged position and a disengaged position, and includes a holder and a roller rotatably mounted on the holder such that the roller is oriented at a first acute angle with respect to the conveyor belt when the roller assembly is in the engaged position, and wherein the holder pivots about a pivot axis substantially centered on the roller.

2. The curved belt conveyor of claim 1, further comprising a ring plate coupled to each of at least some of the plurality of pillars at an end opposite the frame.

3. The curved belt conveyor of claim 1, wherein the roller is oriented at a second acute angle, smaller than the first acute angle, with respect to the conveyor belt when the roller assembly is in the disengaged position.

4. The curved belt conveyor of claim 1, wherein the holder pivots about a pivot axis positioned with respect to a center of the roller such that inward tension from the conveyor belt urges the roller assembly toward the engaged position.

5. The curved belt conveyor of claim 1, further comprising a pair of latches positioned on the holder for engagement with the pillar to retain the roller assembly in the engaged position.

6. The curved belt conveyor of claim 1, further comprising a motor operatively coupled to the first pulley.

7. The curved belt conveyor of claim 1, wherein the plurality of pillars are each comprised of a C-shaped member.

8. A frame pillar assembly for a curved belt conveyor, the frame pillar assembly comprising:
   a C-shaped pillar couplable to the frame of a curved conveyor; and
   a pair of opposed roller assemblies positioned on the C-shaped pillar to cooperatively engage a conveyor belt bead and resist inward tension from the conveyor belt, wherein each roller assembly is pivotably coupled to the C-shaped pillar for movement between an engaged position and a disengaged position, each roller assembly including:
   a holder having a pair of opposed pins defining a pivot axis; and
   a roller rotatably mounted on the holder;
   wherein the roller is oriented at a first acute angle with respect to the conveyor belt when the roller assembly is in the engaged position and the roller is oriented at a second acute angle, smaller than the first acute angle, with respect to the conveyor belt when the roller assembly is in the disengaged position.

9. The frame pillar assembly of claim 8, wherein the pivot axis is substantially centered on the roller.

10. The frame pillar assembly of claim 8, wherein the pivot axis is positioned with respect to a center of the roller such that inward tension from the conveyor belt urges the roller assembly toward the engaged position.

11. The frame pillar assembly of claim 8, wherein the C-shaped pillar includes a pair of opposed hooks positioned to removably receive the pair of opposed pins of the holder.

12. The frame pillar assembly of claim 8, wherein the holder includes a pair of arcuate grooves each centered on a corresponding one of the pair of opposed pins.

13. The frame pillar assembly of claim 8, wherein the pair of opposed roller assemblies is a first pair of opposed roller assemblies and further comprising a second pair of opposed roller assemblies oriented at an angle with respect to the first pair.

14. The frame pillar assembly of claim 8, further comprising a pair of latches positioned on the holder for engagement with the C-shaped pillar to retain the roller assembly in the engaged position.

15. The frame pillar assembly of claim 14, wherein the pair of latches each engage the C-shaped pillar from the outside of the C-shaped pillar.

16. The frame pillar assembly of claim 8, wherein the roller comprises a bearing.

17. A roller assembly for a curved belt conveyor, the roller assembly comprising:
   a holder, including:
      a pair of opposed pins defining a pivot axis;
      a pair of latches positioned for engagement with a conveyor frame assembly; and
      a pair of arcuate grooves each centered on a corresponding one of the pair of opposed pins; and
   a roller rotatably mounted on the holder, wherein the pivot axis is substantially centered on the roller.

18. The roller assembly of claim 17, wherein the roller comprises a bearing.

19. A method of using a frame pillar assembly for a curved belt conveyor, the method comprising:
   pivoting a roller assembly, with respect to a frame pillar, from an engaged position to a disengaged position;
   wherein a roller of the roller assembly is oriented at a first acute angle with respect to a conveyor belt associated with the curved belt conveyor when the roller assembly is in the engaged position and the roller is oriented at a second acute angle, smaller than the first acute angle, with respect to the conveyor belt when the roller assembly is in the disengaged position;
   removing the conveyor belt from the curved belt conveyor while the roller assembly is in the disengaged position;
   installing a second conveyor belt onto the curved belt conveyor while the roller assembly is in the disengaged position; and
   pivoting the roller assembly, with respect to a frame pillar, from the disengaged position to the engaged position.

* * * * *